(12) United States Patent
Sampathkumar et al.

(10) Patent No.: US 11,431,788 B2
(45) Date of Patent: *Aug. 30, 2022

(54) PAIRWISE COMPARISON AND MIGRATION OF WORKLOADS FOR LOAD BALANCING

(71) Applicant: VMware, Inc., Palo Alto, CA (US)

(72) Inventors: Badhrinath Sampathkumar, Santa Clara, CA (US); Zhelong Pan, Cupertino, CA (US); Haoqiang Zheng, Cupertino, CA (US); Fei Guo, San Jose, CA (US); Sabareesh Subramaniam, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,284

(22) Filed: Mar. 22, 2021

(65) Prior Publication Data

US 2021/0211492 A1 Jul. 8, 2021

Related U.S. Application Data

(63) Continuation of application No. 16/527,111, filed on Jul. 31, 2019, now Pat. No. 10,958,719, which is a continuation of application No. 15/286,106, filed on Oct. 5, 2016, now Pat. No. 10,382,535.

(51) Int. Cl.
*H04L 43/16* (2022.01)
*H04L 67/1008* (2022.01)
*H04L 67/1023* (2022.01)
*H04L 41/0896* (2022.01)
*H04L 43/0817* (2022.01)

(52) U.S. Cl.
CPC ...... *H04L 67/1008* (2013.01); *H04L 41/0896* (2013.01); *H04L 43/0817* (2013.01); *H04L 43/16* (2013.01); *H04L 67/1023* (2013.01)

(58) Field of Classification Search
CPC ............. H04L 67/1008; H04L 41/0896; H04L 43/0817; H04L 43/16; H04L 67/1023
See application file for complete search history.

(56) References Cited

U.S. PATENT DOCUMENTS

| | | | | |
|---|---|---|---|---|
| 2005/0267950 | A1* | 12/2005 | Kitamura | ............ G06F 3/0647 709/219 |
| 2007/0130423 | A1* | 6/2007 | Liu | ........................ G06F 3/0647 711/114 |
| 2010/0332658 | A1* | 12/2010 | Elyashev | ................. G06F 9/505 709/226 |
| 2011/0161957 | A1* | 6/2011 | Bernardi | ............. H04L 67/2809 718/1 |
| 2013/0246715 | A1* | 9/2013 | Miyauchi | ............ G06F 12/0284 711/147 |

* cited by examiner

*Primary Examiner* — Viet D Vu
(74) *Attorney, Agent, or Firm* — Thomas | Horstemeyer LLP

(57) ABSTRACT

Load balancing across hosts in a computer system is triggered based on pairwise comparisons of resource utilization at different host. A method for load balancing across hosts includes the steps of determining a resource utilization difference between first and second hosts, wherein the first host has a higher resource utilization than the second host, comparing the resource utilization difference against a threshold difference, and upon determining that the resource utilization difference exceeds the threshold difference, selecting a workload executing in the first host for migration to the second host.

20 Claims, 5 Drawing Sheets

PAIRWISE COMPARISON AND MIGRATION OF WORKLOADS FOR LOAD BALANCING

CROSS-REFERENCE TO RELATED APPLICATIONS

This application is a continuation of and claims the benefit of U.S. Pat. No. 10,958,719 entitled "Pairwise Comparison For Load Balancing," issued Mar. 23, 2021, which is a continuation of U.S. Pat. No. 10,382,535, entitled "Pairwise Comparison for Load Balancing," and issued Aug. 13, 2019, which is hereby incorporated by reference in its entirety.

BACKGROUND

Load balancing is used to distribute workloads across hosts in a cluster, based on various metrics, such as processor utilization, system memory (random access memory) utilization, storage activity (e.g., read and write operations performed against persistent storage of a host machine), network activity (e.g., packet transmission/reception rates, network throughput), and so on. A resource scheduler examines these metrics measured at the individual hosts in the cluster to identify load balancing opportunities.

Resource schedulers generally use standard deviation of resource utilization among multiple hosts in the cluster as a trigger for performing load balancing. In some cases, however, the standard deviation approach may not be sufficient to identify all of the load balancing opportunities. For example, where there are a small number of outliers in the cluster (e.g., hosts having a very high resource utilization relative to the average), load balancing opportunities for such outliers may be missed because the standard deviation may still be below the threshold required to trigger load balancing. As a result, the high resource utilization state in the outliers will continue to exist so long as the standard deviation is below the threshold.

SUMMARY

One or more embodiments implement pairwise comparison of resource utilization by hosts in a cluster for load balancing. A method for load balancing across hosts, according to an embodiment, includes the steps of determining a resource utilization difference between first and second hosts, wherein the first host has a higher resource utilization than the second host, comparing the resource utilization difference against a threshold difference, and upon determining that the resource utilization difference exceeds the threshold difference, selecting a workload executing in the first host for migration to the second host.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
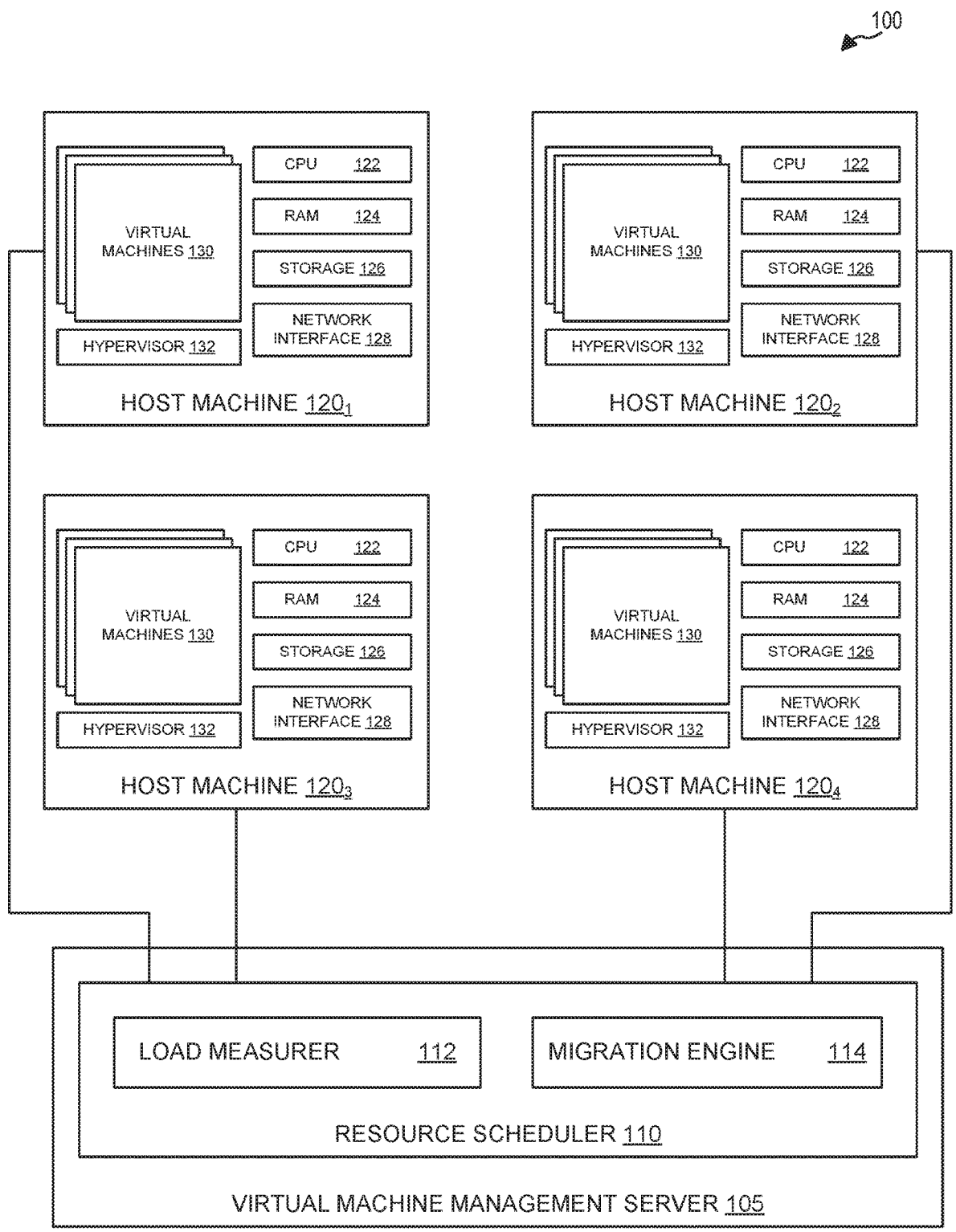
FIG. 1 is a block diagram of a virtualized computing system in which embodiments may be practiced.

FIG. 1 is a block diagram of a virtualized computing system 100, according to one or more embodiments. As illustrated, virtualized computing system 100 includes a virtual machine (VM) management server 105 and a plurality of host machines 120 (referred to as "hosts" hereinafter) that are managed as a logical group or cluster. Hosts 120 may be constructed on a desktop, laptop, or server grade computing hardware platform. As illustrated, each host 120 generally includes one or more central processing units (CPU) 122, system memory (e.g., random access memory) (RAM) 124, storage 126, and network interface 128. Hypervisor 132 is also installed on each host 120 to provide system software functionality (e.g., process creation and control, file system, process threads, etc.) as well as CPU scheduling and memory scheduling to allow for execution of one or more virtual machines 130 therein.

Although embodiments are described herein in the context of a virtualized computing environment and virtual machines executing in hosts managed as a logical group within the virtualized computing environment, embodiments may be generally applied to non-virtualized computing environments, where compute workloads are executing in hosts that are managed as a logical group. In a virtualized environment, examples of compute workloads include virtual computing instances, such as virtual machines and containers. In a non-virtualized environment, examples of compute workloads include web hosting applications, data processing applications, and similar workloads that can be migrated between hosts.

Each host 120 has software tools installed therein for monitoring utilization of its resources, such as processor utilization, system memory usage, storage system throughput or activity, network activity, network throughput, and other metrics. In one embodiment, the resource utilization metrics are compiled on a per-host basis. In another embodiment, the resource utilization metrics are compiled on a per-VM basis and aggregated to produce the total resource utilization metrics at the host system level.

VM management server 105 manages hosts 120 as a cluster and includes a resource scheduling software, hereinafter referred to as resource scheduler 110, executing therein. Software components of resource scheduler 110 include a load measurer 112 and a migration engine 114. Load measurer 112 periodically requests from each host 120 the resource utilization metrics being tracked therein. After load measurer 112 obtains the resource utilization metrics from the hosts 120, resource scheduler 110 determines if a resource utilization difference between any two hosts in the virtualized computing platform exceeds a threshold difference. The threshold difference may be, for example, a user-defined value representing a maximum resource utilization difference (e.g., maximum processor utilization difference, maximum memory usage difference, maximum storage throughput difference, maximum network bandwidth consumption difference, and so on) between two hosts. In some embodiments, the threshold difference may be defined as a percentage difference. If the resource utilization difference between two hosts exceeds the threshold difference, workloads at the more loaded host are evaluated for migration to the less loaded host.

In one embodiment, resource scheduler 110 sorts the hosts in the cluster according to its resource utilization metrics and determines a resource utilization difference between the most loaded host and the least loaded host. If the difference in resource utilization between the most loaded host and the least loaded host is less than the threshold difference, resource scheduler 110 does not trigger load balancing. On the other hand, if the difference in resource utilization between the most loaded host and the least loaded host exceeds the threshold difference, workloads at the most loaded host are evaluated for migration to the least loaded host in the manner described below.

In another embodiment, resource scheduler 110 iterates through different pairs of hosts in the cluster to find two hosts having a resource utilization difference that exceeds the threshold difference. In such cases, workloads at the more loaded host are evaluated for migration to the less loaded host in the manner described below.

The evaluation for migration of a workload between the more loaded host (also referred to as "source host" hereinafter) and the less loaded host (also referred to as "target host" hereinafter) is carried out by resource scheduler 110 and involves an analysis of projected post-migration resource utilization at the two hosts. The evaluation is performed so that the migration does not result in the target host becoming overloaded and the source host becoming underloaded to such an extent that the resource utilization difference between the two exceeds the threshold difference.

In one embodiment, resource scheduler 110 selects a workload at the source host having the highest resource utilization as the first candidate workload for migration. If the projected migration causes the resource utilization at the target host to be greater than the resource utilization at the source host by more than the threshold difference, resource scheduler 110 selects another candidate workload for analysis (e.g., a workload having the next highest resource utilization at the source host). If the projected migration does not cause the resource utilization at the target host to be greater than the resource utilization at the source host by more than the threshold difference, resource scheduler 110 recommends the migration to an administrator who manages the migration using migration engine 114 or directly to migration engine 114.

In another embodiment, resource scheduler 110 selects the workloads for migration based on a difference between the threshold difference and the resource utilization difference between the source host and the target host. For example, if the difference is X, resource scheduler 110 selects the workload that has a resource utilization that is about X/2 as a candidate for migration.

In still another embodiment, resource scheduler 110 iteratively identifies one or more workloads for migration. For example, resource scheduler 110 identifies a workload having the lowest resource utilization at the source host for as the first candidate workload migration. If resource scheduler 110 determines that migration of the first candidate workload does not result in a post-migration resource utilization difference falling below the threshold difference, resource scheduler 110 selects one or more additional workloads at the source host for evaluation until the post-migration resource utilization difference falls below the threshold difference.

Migration engine 114 receives recommendations from resource scheduler 110 identifying one or more workloads to migrate from a source host to a target host. As described above, migration engine 114 in one embodiment receives workload migration recommendations directly from resource scheduler 110. In the embodiment where the administrator manages the migration, workload migration recommendations are displayed to the administrator and migration engine 114 waits for an administrator to select one or more of the workload migration recommendations. Migration engine 114 carries out the workload migration using techniques described in U.S. Pat. No. 7,680,919, the entire contents of which are incorporated by reference herein.

Figure 2:
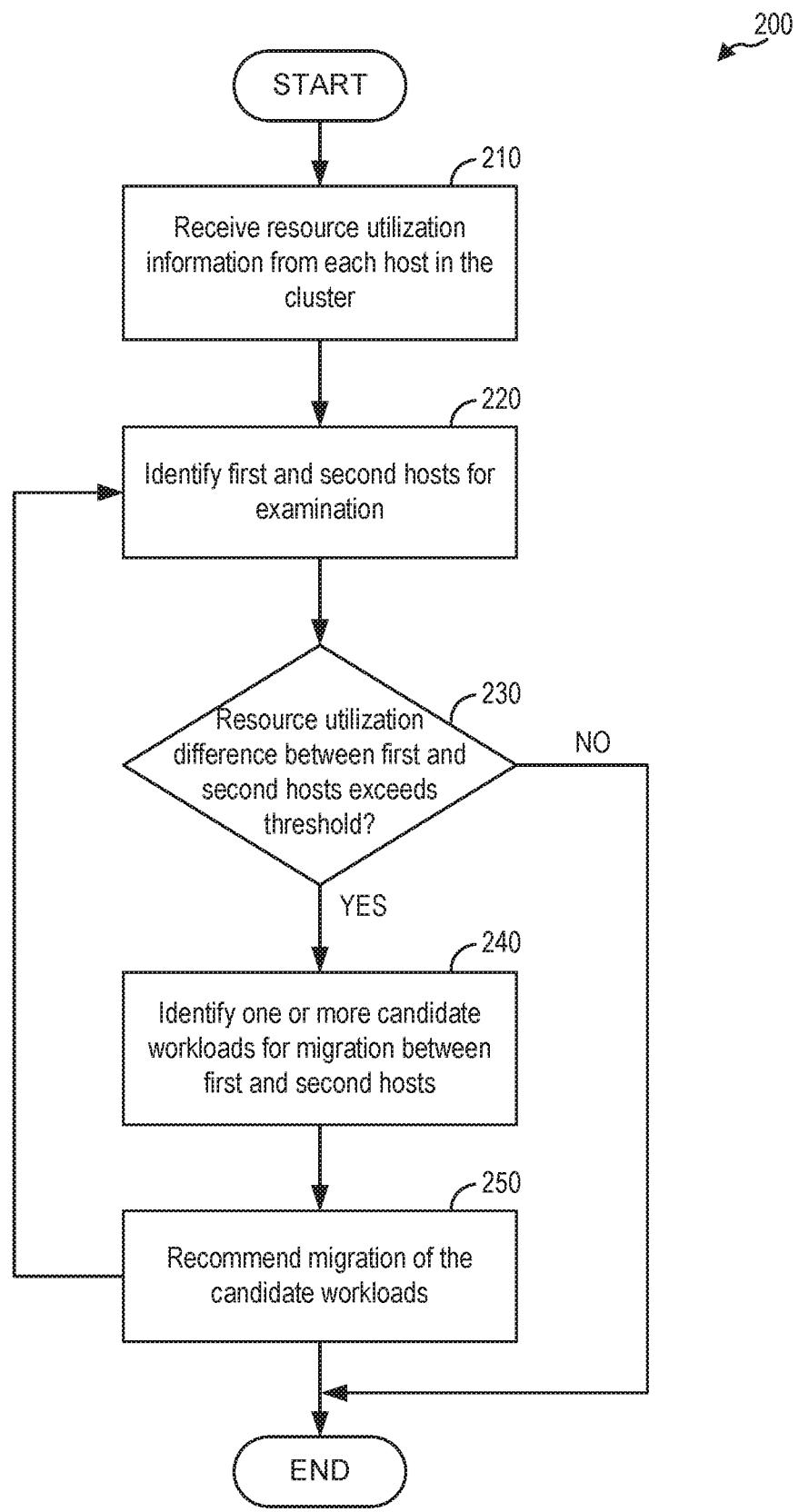
FIG. 2 is a flow diagram of a method for load balancing hosts in a cluster, according to one embodiment.

FIG. 2 illustrates a flow diagram of method 200 for load balancing hosts in a cluster based on pairwise determined differences in resource utilization, according to one embodiment. As illustrated, method 200 begins at step 210, where resource scheduler 110 (in particular, load measurer 112) receives resource utilization information from each host in a cluster in response a request for the resource utilization information transmitted to the hosts.

At step 220, resource scheduler 110 selects a first host and a second host for examination. In the illustrated embodiment, resource scheduler 110 selects the most loaded host (e.g., the first host) and the least loaded host (e.g., the second host). Then, at step 230, resource scheduler 110 determines if the resource utilization difference between the first and second hosts exceeds the threshold difference. If the resource utilization difference between the two hosts is less than the threshold difference, resource scheduler 110 determines that load balancing is not necessary and the process terminates.

On the other hand, if resource scheduler 110 determines that the resource utilization difference between the first and second hosts exceeds the threshold difference, resource scheduler 110 triggers load balancing between the most loaded host and the least loaded host. At step 240, resource scheduler 110 selects one or more candidate workloads for migration from the most loaded host to the least loaded host. The selection of the candidate workloads is further described in conjunction with FIG. 3.

At step 250, resource scheduler 110 recommends the migrations of the candidate workloads identified at step 240 to the administrator or directly to migration engine 114. After step 250, method 200 returns to step 220, where resource scheduler 110 selects the next two hosts for examination. In the embodiment, the next most loaded host and the next least loaded host are selected. The steps after 220 are carried out in the same manner as described above. So long as the resource utilization difference between the two hosts selected in step 220 exceed the threshold difference (as determined at step 230), method 200 continues to recommend workload migrations. Once the resource utilization difference between the two hosts selected in step 220 becomes less than the threshold difference, method 200 terminates.

Figure 3:
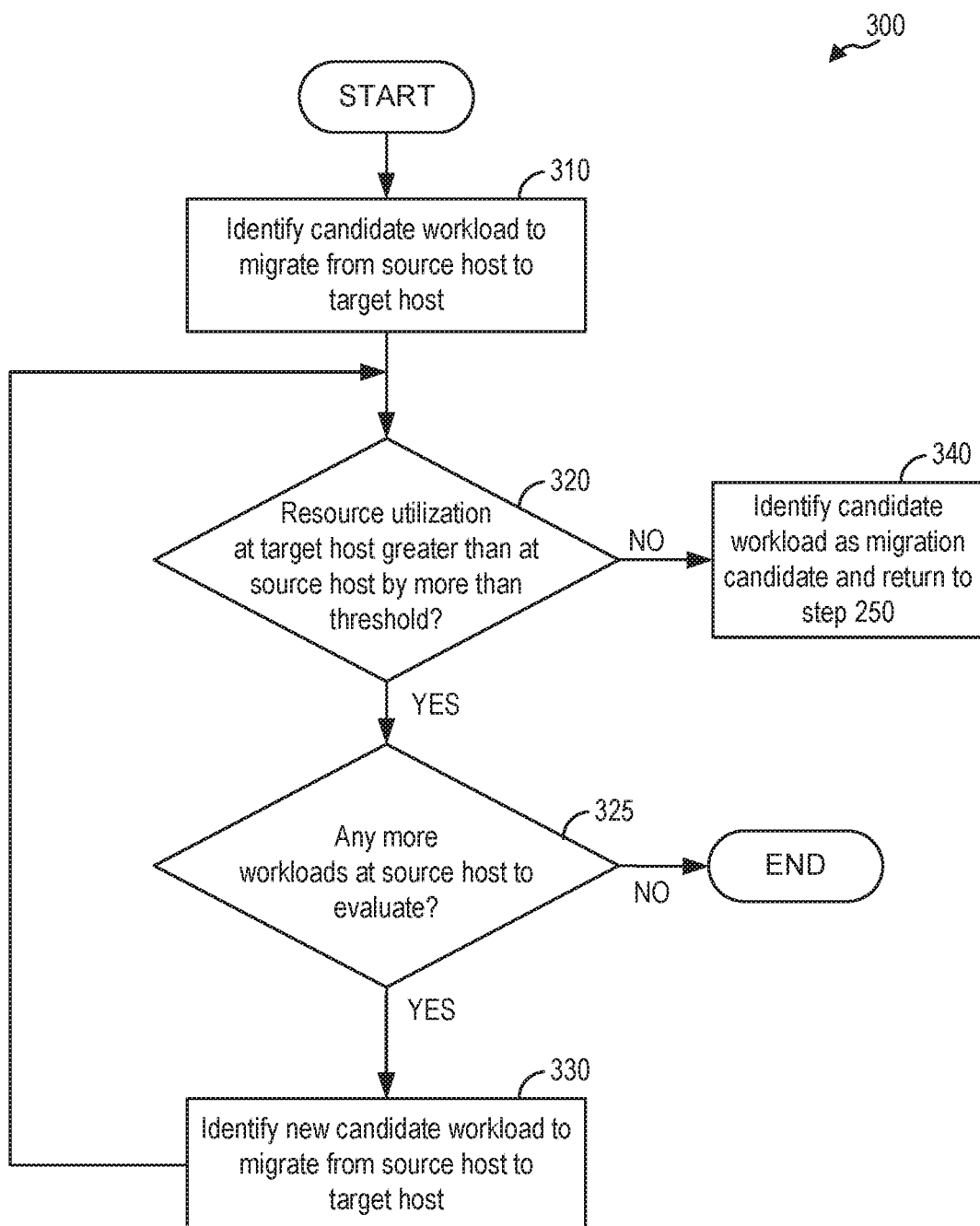
FIG. 3 is a flow diagram of a method for identifying workloads to migrate between hosts, according to an embodiment.

FIG. 3 illustrates example operations performed by resource scheduler 110 to identify a candidate workload to migrate from a more loaded host (source host) to a less loaded host (target host), according to an embodiment. As illustrated, method 300 starts at step 310, where resource scheduler 110 selects a candidate workload to migrate from the source host to the target host. In method 300, the workload having the highest resource utilization is selected at step 310. At step 320, resource scheduler 110 determines if the projected migration causes the resource utilization at the target host to be greater than the resource utilization at the source host by more than the threshold difference. If so, the flow proceeds to step 325 where resource scheduler 110 determines if there is another workload at the source host to evaluate. If there is none, method 300 terminates. If there is more, resource scheduler 110 at step 330 selects the workload having the next highest resource utilization at step 330 as a new candidate workload for migration, and the new candidate workload for migration is evaluated at step 320. On the other hand, if the projected migration does not cause the resource utilization at the target host to be greater than the resource utilization at the source host by more than the threshold difference, resource scheduler 110 at step 340 identifies the candidate workload as the migration candidate to be recommended for migration at step 250.

Figure 4:
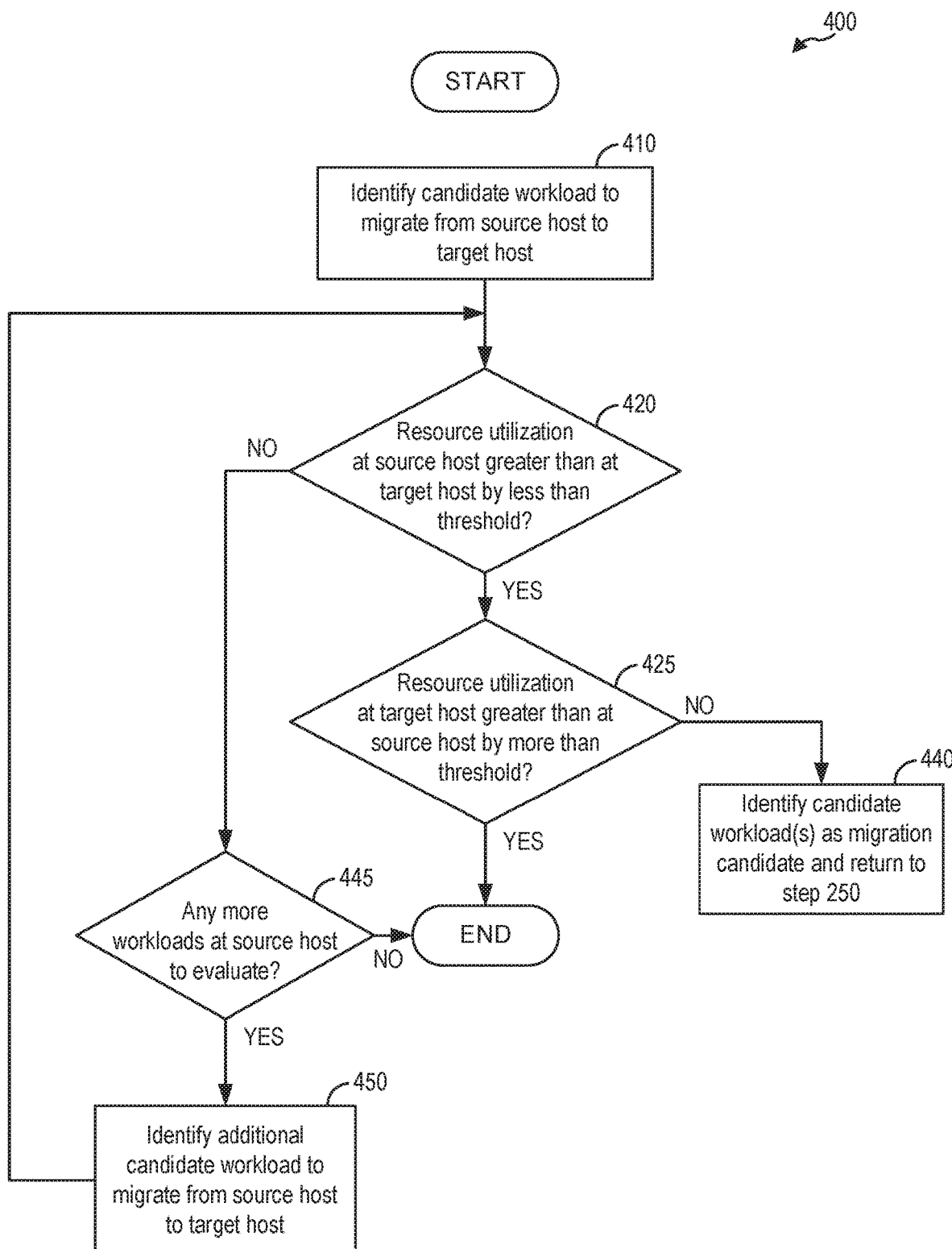
FIG. 4 is a flow diagram of a method for identifying workloads to migrate between hosts, according to another embodiment.

FIG. 4 illustrates example operations performed by resource scheduler 110 to identify a candidate workload to migrate from a more loaded host (source host) to a less loaded host (target host), according to another embodiment. As illustrated, method 400 starts at step 410, where resource scheduler 110 selects a candidate workload to migrate from the source host to the target host. In method 400, the workload having the lowest resource utilization is selected at step 410. At step 420, resource scheduler 110 determines if the projected migration causes the resource utilization difference between the source host and the target host to be less than the threshold difference. If so, resource scheduler 110 at step 425 determines if the projected migration causes the resource utilization at the target host to be greater than the resource utilization at the source host by more than the threshold difference. If the determination at step 425 is NO, resource scheduler 110 at step 440 identifies the candidate workload (or workloads if more than one have been evaluated as a result of adding a workload at step 440) as the migration candidate(s) to be recommended for migration at step 250. If the determination at step 425 is YES, method 400 terminates without recommending any workload migrations.

Returning to decision at step 420, if resource scheduler 110 determines if the projected migration does not cause the resource utilization difference between the source host and the target host to be less than the threshold difference, the flow proceeds to step 445 where resource scheduler 110 determines if there is another workload at the source host to evaluate. If there is none, method 400 terminates. If there is more, resource scheduler 110 selects the workload having the next higher resource utilization (i.e., the workload with the least resource utilization amongst the remaining workloads) as an additional candidate workload for migration at step 450 and evaluates the projected migration including all candidate workloads at step 420. The evaluation at step 420 and the steps thereafter are carried out in the same manner as described above.

In the embodiments, if both the source host and the target host have the same hardware configuration, resource scheduler 110 can assume that the resource utilization for a workload is the same on both hosts. In other cases, if the hardware configurations of the source host and the target host are different, resource scheduler 110 can adjust the projected resource utilization based on the hardware configuration differences. For example, projected processor utilization may be adjusted based on differences in the processor configuration and performance between the source host and the target host (e.g., according to a model for scaling processor performance based on a number of cores, a number of threads executable on each core, processor clock speed, and so on).

Figure 5A:
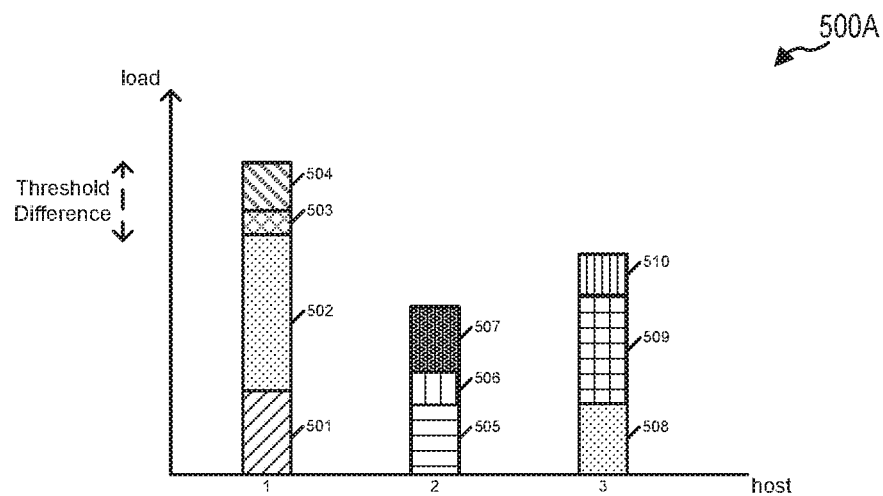
FIGS. 5A and 5B are charts illustrating a resource utilization difference between hosts before and after migration of a workload.
Figure 5B:
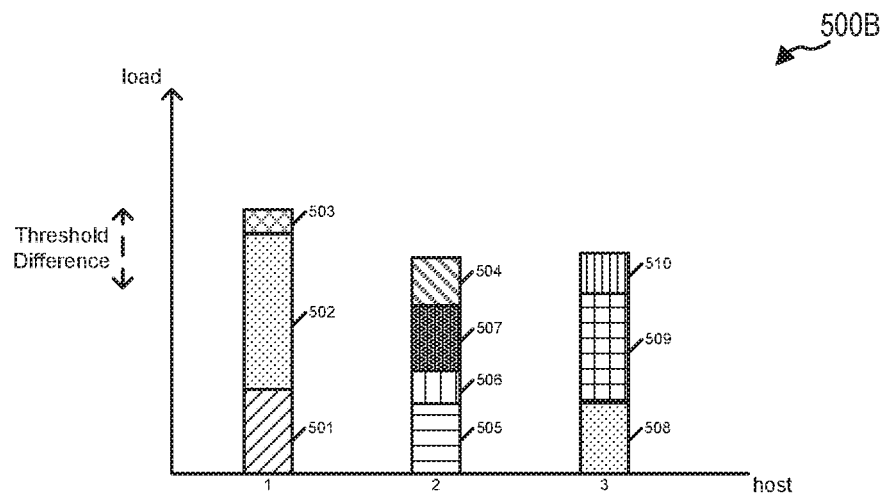

FIGS. 5A and 5B illustrate example resource utilization graphs for a plurality of hosts. Resource utilization graph 500A illustrates a scenario in which the resource utilization difference between host 1 (e.g., the host machine with the highest resource utilization) and host 2 (e.g., the host machine with the lowest resource utilization) exceeds a difference threshold. As illustrated, workloads 501, 502, 503, and 504 are executing on host 1; workloads 505, 506, and 507 are executing on host 2; and workloads 508, 509, and 510 are executing on host 3.

According to embodiments, resource scheduler 110 determines that the resource utilization difference between hosts 1 and 2 exceeds the threshold difference. Based on the determination that the resource utilization difference between hosts 1 and 2 exceeds the threshold difference, resource scheduler 110 examines resource utilization for each workload executing on host 1 to identify candidate workloads for migration to host 2. As illustrated in post-migration resource utilization graph 500B, resource scheduler 100 identified workload 504 as the workload to be migrated from host 1 to host 2. The post-migration resource utilization difference between host 1 and host 2, as illustrated, is less than the threshold difference. It should be recognized that resource scheduler 110 did not select workload 502 for migration from host 1 to host 2 because such a migration would have caused host 2 to be overloaded and host 1 to be underloaded to an extent the resource utilization difference between hosts 1 and 2 would have exceeded the threshold difference.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for load balancing across hosts, comprising:
   determining a resource utilization difference between first and second hosts, wherein the first host has a higher resource utilization than the second host;
   comparing the resource utilization difference against a threshold difference;
   upon determining that the resource utilization difference exceeds the threshold difference, iteratively selecting a plurality of workloads executing in the first host for migration to the second host by identifying at least two workloads on the first host and determining that a resulting resource utilization of the second host after performing the migration is less than the first host; and
   migrating the at least two workloads from the first host to the second host.

2. The method of claim 1, wherein selecting the at least two workloads comprises:
   selecting a first workload executing in the first host to evaluate for migration from the first host to the second host;
   estimating a resource utilization difference between the first and second hosts that would result if the first workload is migrated from the first host to the second host; and
   upon determining that the estimated resource utilization difference is less than the threshold difference, selecting the first workload as the workload for migration from the first host to the second host.

3. The method of claim 2, wherein selecting the at least two workloads further comprises:
   upon determining that the estimated resource utilization difference is greater than the threshold difference, selecting a second workload executing in the first host to evaluate for migration from the first host to the second host.

4. The method of claim 3, wherein the first workload has a higher resource utilization than the second workload.

5. The method of claim 2, wherein selecting the at least two workloads further comprises:
   upon determining that the estimated resource utilization difference is greater than the threshold difference, selecting a second workload executing in the first host to evaluate as an additional workload for migration from the first host to the second host.

6. The method of claim 5, wherein the first workload has a lower resource utilization than the second workload.

7. The method of claim 1, further comprising:
   sorting the hosts in accordance with each host's resource utilization,
   wherein the first host has the highest resource utilization and the second host has the lowest resource utilization.

8. The method of claim 1, wherein the resource utilization is one of processor utilization or system memory usage.

9. The method of claim 1, wherein the at least two workloads are selected by identifying two workloads having the smallest resource utilization on the first host.

10. A method comprising:
- determining a resource utilization difference between first and second hosts, wherein the first host has a higher resource utilization than the second host;
- comparing the resource utilization difference against a threshold difference, the resource utilization difference comprising a metric associated with at least one of a processor utilization difference, a memory usage difference, a storage throughput difference, or a network bandwidth consumption difference;
- selecting a first workload executing in the first host to evaluate for migration from the first host to the second host;
- estimating a resource utilization difference between the first and second hosts that would result if the first workload is migrated from the first host to the second host; and
- upon determining that the estimated resource utilization difference is less than the threshold difference, selecting the first workload as the workload for migration from the first host to the second host;
- selecting a second workload executing in the first host for migration from the first host to the second host;
- estimating a resource utilization difference between the first and second hosts that would result if the second workload is migrated from the first host to the second host; and
- upon determining that the estimated resource utilization difference is less than the threshold difference, selecting the second workload as the workload for migration from the first host to the second host;
- migrating the first workload and the second workload from the first host to the second host.

11. The method of claim 10, wherein the first workload has a higher resource utilization than the second workload.

12. The method of claim 10, wherein the first workload has a lower resource utilization than the second workload.

13. The method of claim 10, further comprising:
- sorting the hosts in accordance with each host's resource utilization,
- wherein the first host has the highest resource utilization and the second host has the lowest resource utilization.

14. A non-transitory computer readable medium embodying instructions executable by a processor, the instructions causing the processor to at least:
- determine a resource utilization difference between first and second hosts, wherein the first host has a higher resource utilization than the second host;
- compare the resource utilization difference against a threshold difference;
- upon determining that the resource utilization difference exceeds the threshold difference, iteratively select a plurality of workloads executing in the first host for migration to the second host by identifying at least two workloads on the first host and determining that a resulting resource utilization of the second host after performing the migration is less than the first host; and
- migrate the at least two workloads from the first host to the second host.

15. The non-transitory computer readable medium of claim 14, wherein selecting the at least two workloads comprises:
- selecting a first workload executing in the first host to evaluate for migration from the first host to the second host;
- estimating a resource utilization difference between the first and second hosts that would result if the first workload is migrated from the first host to the second host; and
- upon determining that the estimated resource utilization difference is less than the threshold difference, selecting the first workload as the workload for migration from the first host to the second host.

16. The non-transitory computer readable medium of claim 15, wherein selecting the at least two workloads further comprises:
- upon determining that the estimated resource utilization difference is greater than the threshold difference, selecting a second workload executing in the first host to evaluate for migration from the first host to the second host.

17. The non-transitory computer readable medium of claim 16, wherein the first workload has a higher resource utilization than the second workload.

18. The non-transitory computer readable medium of claim 14, wherein selecting the at least two workloads further comprises:
- sorting the hosts in accordance with each host's resource utilization,
- wherein the first host has the highest resource utilization and the second host has the lowest resource utilization.

19. The non-transitory computer readable medium of claim 14, wherein the resource utilization is one of processor utilization or system memory usage.

20. The non-transitory computer readable medium of claim 17, wherein the at least two workloads are selected by identifying two workloads having the smallest resource utilization on the first host.

* * * * *